Jan. 8, 1952     T. CARRIGAN     2,581,630
WHEEL GAUGING APPARATUS

Filed Sept. 10, 1945     4 Sheets-Sheet 1

Inventor
TRACY CARRIGAN.
By Philip A. Minnis.
Attorney

Jan. 8, 1952  T. CARRIGAN  2,581,630
WHEEL GAUGING APPARATUS
Filed Sept. 10, 1945  4 Sheets-Sheet 2
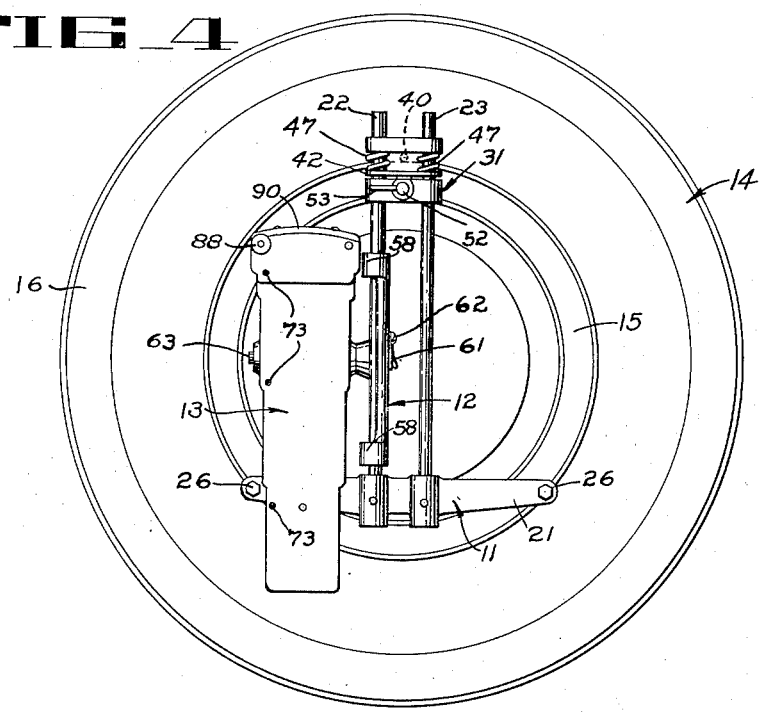
FIG_4
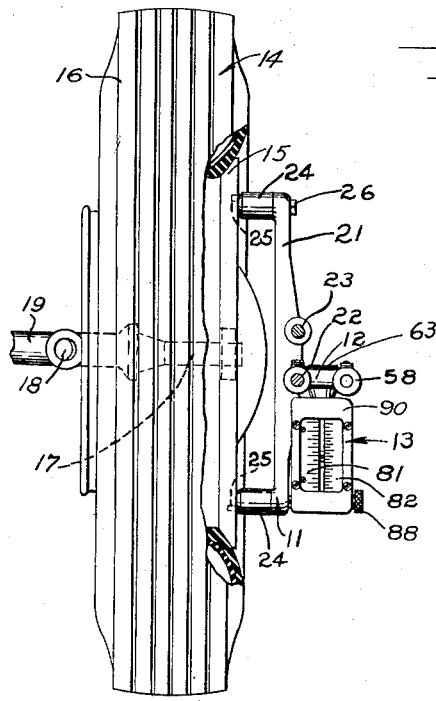
FIG_5
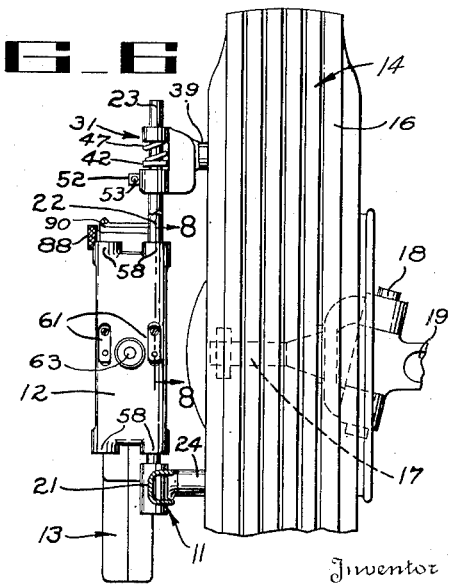
FIG_6
Inventor
TRACY CARRIGAN.
By Philip A. Minnis
Attorney Jan. 8, 1952 T. CARRIGAN 2,581,630
WHEEL GAUGING APPARATUS
Filed Sept. 10, 1945 4 Sheets-Sheet 3
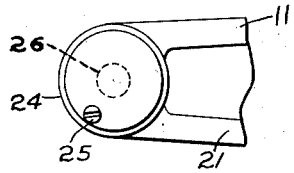
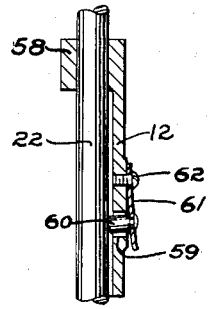
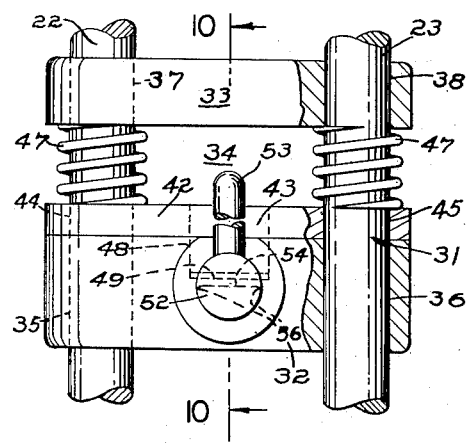
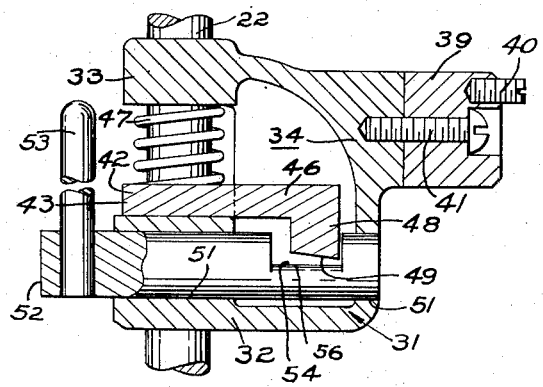
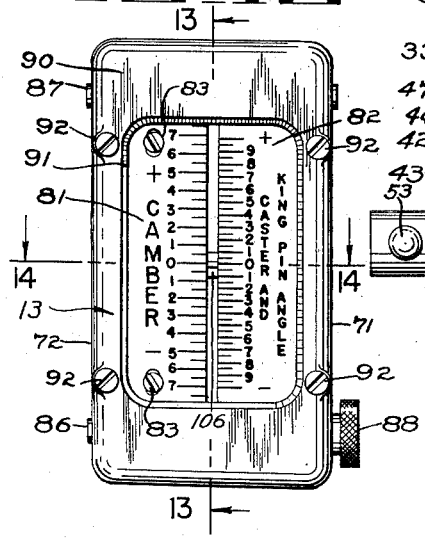
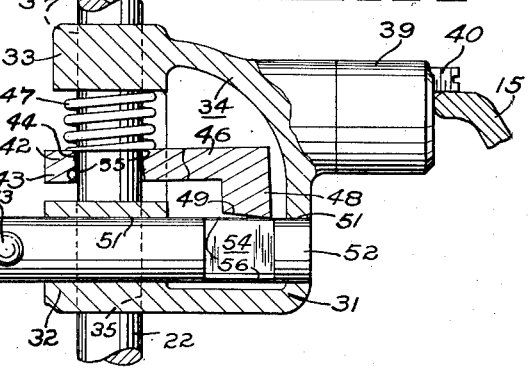
Inventor
TRACY CARRIGAN.
By Philip A. Minnis
Attorney Jan. 8, 1952 T. CARRIGAN 2,581,630
WHEEL GAUGING APPARATUS
Filed Sept. 10, 1945 4 Sheets-Sheet 4
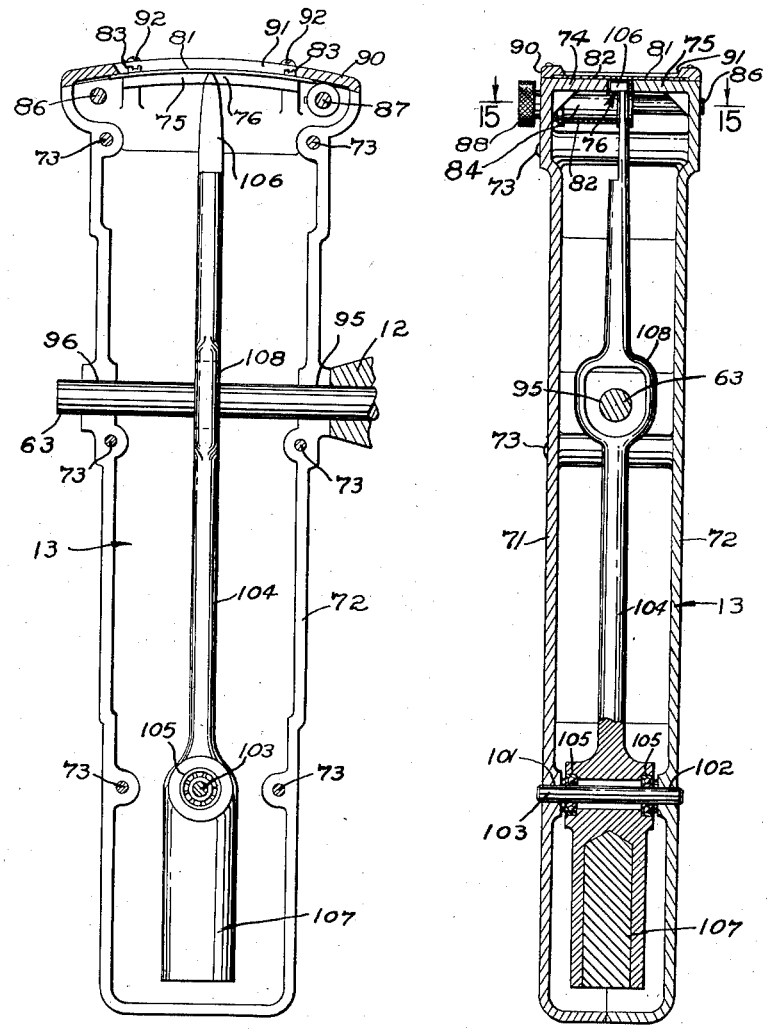
FIG 13 FIG 14
FIG 15
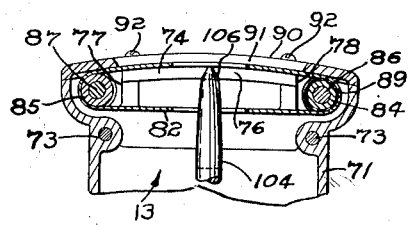
FIG 16
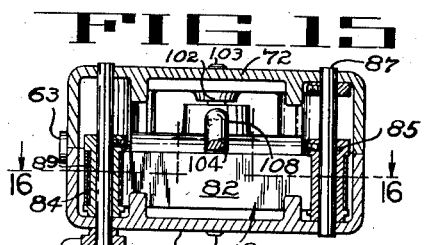
Inventor
TRACY CARRIGAN.
By Philip A. Minnis
Attorney Patented Jan. 8, 1952

2,581,630

UNITED STATES PATENT OFFICE 2,581,630

WHEEL GAUGING APPARATUS

Tracy Carrigan, Lansing, Mich., assignor to Food Machinery and Chemical Corporation, a corporation of Delaware Application September 10, 1945, Serial No. 615,444

8 Claims. (Cl. 33—203.18)

This invention relates to the art of measuring alignment characteristics of dirigible vehicle wheels, and its general object is to provide an improved portable gauging apparatus for determining the camber, caster, and king pin inclination of such wheels.

It is also an object of the invention to provide an apparatus of the character referred to which is simple and light weight in construction, accurate in operation, and easily manipulated.

A further object of the invention is to provide a wheel gauging apparatus which can be manufactured economically, and which is of compact construction and neat in appearance.

Additional objects and advantages of the invention will more readily appear from the following description of a preferred embodiment, as illustrated in the accompanying drawings, in which:

Fig. 4 is a view similar to Fig. 3 showing the apparatus applied to the wheel in position to determine the king pin inclination;

Fig. 5 is a plan view of the structure shown in Fig. 4, with a portion of the tire broken away and the upper locking member of the clamp removed;

Fig. 6 is a rear elevation partly in section of the apparatus shown in Fig. 5;

Fig. 7 is an enlarged fragmentary elevation of one end of the cross arm of the clamp, looking at the rear face thereof;

Fig. 8 is an enlarged vertical section taken along the line 8—8 of Fig. 6;

Fig. 9 is an enlarged front elevation of the upper portion of the clamp, parts being broken away, showing the locking mechanism in unlocked position;

Fig. 10 is a vertical section taken along the line 10—10 of Fig. 9;

Fig. 11 is a sectional view similar to Fig. 10 showing the locking mechanism in locked position, with portions broken away and other portions of the structure in elevation;

Fig. 12 is a plan view of the wheel aligning gauge removed from the bracket;

Fig. 13 is a vertical longitudinal section taken along the line 13—13 of Fig. 12;

Fig. 14 is a vertical transverse section taken along the line 14—14 of Fig. 12;

Fig. 15 is a horizontal section taken along the line 15—15 of Fig. 14; and

Fig. 16 is a vertical section taken along the line 16—16 of Fig. 15.

Figure 1:
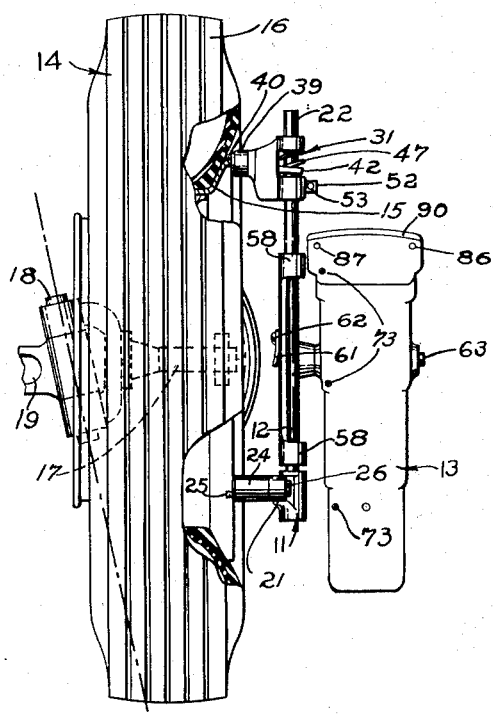
Fig. 1 is a front elevation of a conventional dirigible wheel of an automobile showing the gauging apparatus of the present invention applied to the wheel in position to determine the camber and the caster, a portion of the tire being broken away to facilitate the disclosure.
Figure 2:
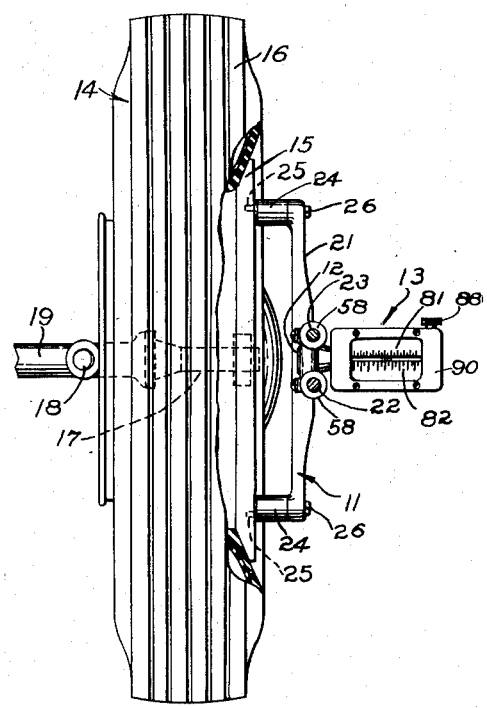
Fig. 2 is a plan view of the structure shown in Fig. 1, with portion of tire broken away and the upper locking member of the clamp removed.
Figure 3:
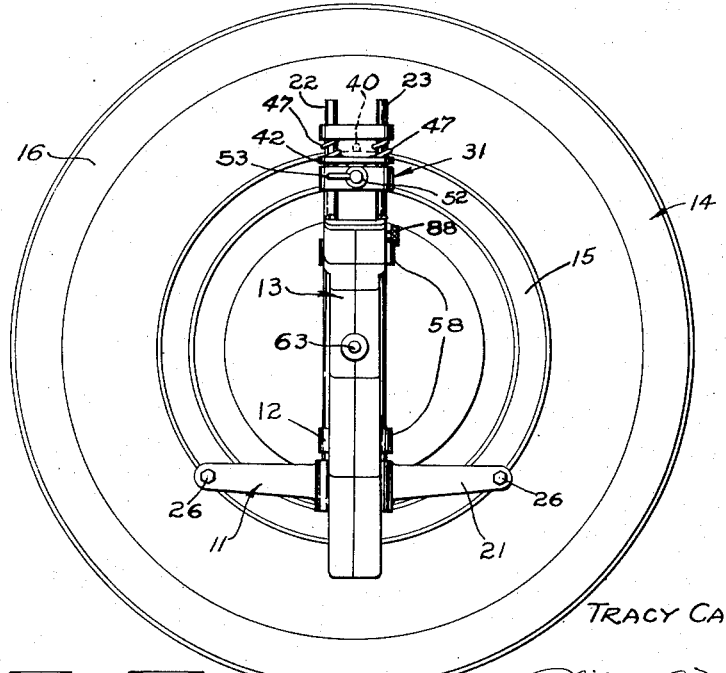
Fig. 3 is a side elevation of the structure shown in Fig. 1.

Referring to the drawings, and especially to Figs. 1, 2 and 3, the gauging apparatus comprises a clamp generally indicated at 11, a bracket 12 slidably mounted on said clamp, and a gauge 13 carried by said bracket. As a unit these three elements are adapted to be mounted on the dirigible wheel of a vehicle, such as the front wheel of an automobile shown at 14. By mounting the gauge 13 in proper relation to the clamp 11 and then moving the wheel to certain positions in the manner to be hereinafter described, an operator can quickly check the caster, camber, and king pin inclination of the wheel. The apparatus may then easily be removed and applied to the opposite wheel to determine its caster, camber and king pin inclination.

The front wheel 14 herein shown includes a rim 15 adapted to support a tire 16, the wheel having the usual hub mounted on a stub axle or spindle 17 pivoted on a king pin 18 carried by the usual structure 19 at the front end of an automobile.

The clamp 11 is substantially in the form of an inverted T having a cross arm 21 from which a pair of parallel rods 22, 23 project upwardly and constitute the stem of the T. The rods 22, 23 are spaced a suitable distance relative to each other and are arranged equidistantly at opposite sides of a line extending perpendicularly from the mid point of the cross arm 21.

Secured to and projecting laterally from each extremity of the cross arm 21, is a spacer block or lug 24 which constitutes means for spacing the clamp 11 from the side of the wheel 14. For convenience each spacer block 24 is cylindrical and has a flat outer face adapted to be positioned against the periphery of the rim 15 of the wheel. A screw stud 25 is mounted in the end of each block or lug 24, said stud being preferably formed of hardened steel and being arranged eccentric with respect to the center of the circular face of the spacer block, as shown in Fig. 7. The screw stud 25 projects outwardly from the spacer block a suitable distance so that it can engage the rim 15 in the manner to be hereinafter described. Each spacer block or lug 24 is secured to the cross arm 21 by means of a cap screw 26. By loosening the cap screws 26 the spacer block can be rotated so that the screw stud 25 can be positioned to engage either the inside or the outside of the periphery of the rim 15. In the present instance the parts are shown positioned so that the screw studs 25 will engage the outside of the rim 15.

For the purpose of enabling the clamp 11 to be easily and quickly attached to a wheel and detached therefrom, a locking device 31 is slidably mounted on the two rods 22, 23. The locking device comprises a body having a lower portion 32, an upper portion 33 arranged in spaced relation to the lower portion and connected thereto by an intermediate portion 34, which is somewhat arcuate in form and which extends rearwardly from the front portion of the locking device, as shown in Figs. 10 and 11.

The lower portion 32 of the locking device is formed with vertical bearing openings 35, 36, and the upper portion 33 is formed with vertical bearing openings 37, 38. The openings 35, 37 are arranged in vertical alignment to receive the rod 22, and the openings 36, 38 are arranged in vertical alignment to receive the rods 23 (see Fig. 9).

Secured to and projecting rearwardly from the portion 34 of the body 31 is a spacer block or lug 39 which constitutes means for spacing the locking device from the side of the wheel 14. The block 39 is substantially similar to the blocks 24 carried by the cross arm 21 and said block 39 has a hardened steel screw stud 40 mounted in the end face thereof, said screw stud being arranged eccentric with respect to the center of the circular face of the spacer block 39 and projecting outwardly from said spacer block a suitable distance, as shown in Figs. 10 and 11. The spacer block 39 is secured to the portion 34 of the body of the locking device by means of a screw 41 which is arranged concentrically in said block, the construction and arrangement of the parts being similar to the construction and arrangement of the spacer blocks 24 heretofore described. The studs 25 and 40 provide means for engaging the periphery of the rim 15 of a wheel at three widely separated points when the clamp 11 is mounted on the wheel in the manner shown in Fig. 3, so that the clamp can be made rigid with the wheel.

Interposed within the body 31, in the space between the lower portion 32 and the upper portion 33, is a locking plate 42, comprising a substantially T-shaped body having a cross arm 43 formed with two spaced openings 44, 45 adapted to loosely receive the rods 22, 23, respectively, and an arm or stem 46 arranged at right angles to the cross arm 43. The cross arm portion 43 of the locking plate 42 overlies the portion 32 of the body 31 of the locking device, and interposed between the upper face of the cross arm 43 and the lower face of the upper portion 33 of the body 31 and encircling the rods 22, 23, are coiled springs 47, which normally maintain the locking plate 42 in face to face relationship with the upper face of the lower portion 32 of the body 31. Projecting downwardly from the extremity of the arm 46 of the locking plate 42, is a lug 48 having a cam surface 49 which is inclined upwardly from the lower rear edge of the lug, as shown in Fig. 11.

Rotatably mounted in aligned openings 51 formed in the lower portion 32 of the body 31 of the locking device, is an actuator shaft 52 for the locking plate 42. The shaft 52 is disposed between the rods 22, 23, being located substantially along the longitudinal center line of the body of the locking device, as shown in Fig. 9. The outer end of the actuator shaft 52 is provided with a handle 53 by which said shaft may be rotated, and near its inner end the actuator shaft 52 is provided with a transverse slot or recess 54 for the reception of the lug 48 when the parts are in the position shown in Fig. 10.

The construction and operation of the parts so far described is such that the clamp 11 may be applied to the wheel with the studs 25 positioned against the outer edge of the rim 15, and the locking device 31, in its unlocked position, as shown in Figs. 9 and 10, is then slidably adjusted along the rods 22, 23 to bring the stud 40 into engagement with the outer edge of the rim 15, as shown in Fig. 11.

The clamp, while thus positioned, is now pressed inwardly firmly against the rim 15 and while it is so held, the handle 53 of the locking device is turned so as to rotate the actuator shaft 52. The first reaction of this rotation is to cause the surface of the recess 54 of the actuator shaft to lift on the lug 48 of the locking plate 42 thereby tilting this plate relative to the rods 22, 23, as shown in Fig. 11. The openings 44, 45 in the locking plate 42 through which the rods 22, 23 extend are just large enough for the locking plate to be tilted so that it binds against the rods when the locking plate reaches the limit of this tilting movement. The rotation of the actuator shaft 52, is continued however, with the result that the action of the surface of the recess 54 of the actuator shaft is to slide the body of the locking device 31 downwardly on the rods 22, 23, over a short distance but with considerable force. The force of this movement is sufficient to cause the studs 25 and 40 to tightly engage the periphery of the rim 15. As this motion is completed, the edge 56 of the actuator shaft 52 engages the inclined surface 49 of the locking plate 42. This locks the locking device 31 in the position into which it was just moved on the rods 22, 23 which maintains the studs 25 and 40 in tight engagement with the wheel rim 15 until the actuator shaft 52 is reversely rotated to restore the locking device 31 to slidable relation with the rods 22, 23. The locking device 31 can then be slid upwardly of the rods 22, 23 to disconnect the stud 40 from the rim 15. The main body of the clamp 11 can then be lowered to disconnect the studs 25 from the rim 15.

In case a wheel is encountered in which space is not available to accommodate the studs 25 and 40 outside the rim 15, the clamp 11 may be applied to the rim with the studs 25 and 40 contacting the interior face of the periphery of the rim. This is accomplished by loosening the cap screws 26 and 41 respectively, rotating the spacer blocks 24 and 39, respectively a half turn each, and then tightening the cap screws. The locking device 31 is then slid off of the rods 22, 23, inverted, and then replaced on these bars.

The clamp 11 is now ready for application to the rim of a wheel with the studs 25 and 49 engaging the interior surface of that rim. The handle is then actuated to cause the locking plate 42 to grip the rods 22, 23 and shift the locking plate upwardly forcefully to impinge the studs 25, 40 in the inner surface of the rim 15 and thus unite the clamp 11 with the rim. The relaxing of the locking plate 42 releases the clamp 11 from this position in exactly the same manner as previously described for the position in which the studs 25, 49 are disposed outside the rim.

As shown in Figs. 1, 2 and 6, the bracket 12 comprises a body of substantially rectangular form having a bearing boss 58 at each corner thereof, each boss having an opening bored lengthwise thereof for receiving the rods 22, 23 whereby the bracket is slidably supported by said rods and can be moved rectilinearly thereon. In order to retain the bracket 12 in adjusted position with respect to the rods 22, 23, the body of the bracket is formed with a pair of openings 59 which are spaced apart a distance equal substantially to the distance between the longitudinal center lines of the rods, 22, 23. Disposed within each opening 59 is a lug 60 carried by an end portion of a leaf spring 61, the other end of the leaf spring being secured to the body of the bracket by a screw 62 or other suitable means, as shown in Fig. 8. The leaf spring is adapted to force the nose of the lug 60 against the surface of the adjacent rod so that the bracket is frictionally retained in position on the rods 22, 23 in well known manner. Projecting outwardly from the central portion of the bracket 12, is a pivot arm 63 adapted to support the gauge 13 in the manner to be hereinafter described.

As shown in Figs. 12, 13, 14, 15 and 16, the gauge 13 comprises an elongated substantially rectangular hollow housing formed of two complementary sections, one of which is indicated at 71 and will be referred to as the front section, and the other of which is indicated at 72 and will be referred to as the rear section.

The housing sections 71, 72 are assembled together with their marginal edges face to face, and said sections are held together by means of screws 73, or other suitable means arranged in suitable spaced-relation around the periphery of the gauge body.

Each of the housing sections 71, 72 has an inwardly projecting arcuate ledge at its upper end, these ledges being indicated at 74 and 75, respectively, Fig. 14. The adjacent longitudinal edges of the ledges 74 and 75 are spaced apart, as shown, to provide a slot 76 which extends across the top of the housing, the ends of said ledges being spaced from the end walls of the housing, as indicated at 77, 78 in Fig. 16.

As shown in Fig. 12 two sets of scales 81 and 82, are provided, one for use in determining the camber, and the other for use in determining caster and king pin inclination. The camber scale 81 includes suitable graduations formed on a scale plate, which plate is adjustably secured to the arcuate ledge 75 by a pair of screw studs 83 each of which extend through a slot in the scale, Fig. 12. The slots in the scale 81 are arranged in such a manner that the scale can be adjusted to set the zero position of the scale correctly.

The scale 82 comprises an endless band or loop formed of suitably flexible, ribbon-like material which encircles two spaced rollers 84, 85, suitable graduations being formed on a portion of the loop, as shown in Fig. 12. The rollers 84, 85 are fixedly mounted on shafts 86, 87, respectively, said shafts being journalled in the front and rear housing sections 71, 72 and being disposed transversely of the housing, as shown in Figs. 13, 14, 15 and 16. The roller 85 is an idler roller. The shaft 86 on which the roller 84 is mounted projects a suitable distance beyond the front face 71 of the housing of the gauge and has mounted thereon a knob 88 which is conveniently located outside of the housing for manipulation by an operator. In order to prevent the material comprising the scale 82 from slipping when the roller 84 is rotated, said roller is covered or coated with rubber or other suitable friction material, as indicated at 89, Figs. 15, 16. The friction material 89 is designed to provide a traction surface for the scale loop 82. The construction and arrangement of the parts is such that the upper flight of the loop material comprising the scale 82 rests upon the upper surface of the arcuate top wall 74, the side edge of the scale 82 being spaced from the adjacent longitudinal side edge of the scale plate 81 above the slot 76, as shown in Fig. 14.

Mounted on top of the body of the gauge is a cover 90 provided with an inspection opening 91 through which the scales 81, 82 are exposed, said cover having a depending flange formed around its periphery so that the main body of the cover is spaced from the upper surfaces of the scales. In this way the scale 82 is freely movable when the knob 88 is operated. The cover 90 is held fixed in position by means of screws 92, Fig. 12.

Aligned bearing openings 95 and 96 are formed in the end walls of the gauge housing at a suitable point above the center of gravity of the gauge for the reception of the gauge supporting arm 63 and the gauge is freely journalled on this arm so that it will automatically gravitate to vertical position with the top of the gauge uppermost at all times.

At a distance below the point in the body of the gauge 13 in which the bearing openings 95, 96 are located, additional aligned bearing openings 101, 102, are formed in the front and rear walls respectively, of the gauge housing for a shaft 103. The shaft 103 is disposed at right angles with respect to the gauge supporting arm 63, as shown in Figs. 13 and 14, and said shaft provides means for supporting a pendulum pointer 104, which is rotatably mounted on the shaft by means of ball bearings 105. The pendulum pointer 104 comprises an upwardly projecting pointer 106 and a weighted lower end 107 adapted to maintain the pendulum pointer 104 in a vertical position at all times. The upper end 106 of the pendulum pointer is located within the slot 76 for oscillatory movement therealong in proximity to the indicia on the scales 81, 82.

It is to be observed that in the illustrated embodiment of the present invention the axis of the pendulum pointer 104 is disposed at right angles with respect to the axis of the shaft 63. This arrangement of the parts is desirable for purposes of compact construction. In order to make this arrangement of the pendulum pointer with respect to the shaft 63 possible the pendulum pointer 104 is offset to clear the shaft 63, the offset being in the form of an eye 108, Fig. 14. The area of the eye should be such that the pendulum pointer 104 is free to swing within the housing of the gauge about the pivot provided by shaft 103 without interference by the arm 63. In this way free oscillation of the gauge on the supporting arm 63, as well as free oscillation of the pendulum pointer 104 within the gauge housing is provided for.

In order to check caster the gauge is mounted on the wheel in the manner shown in Figs. 1, 2 and 3 so that the shaft 103 of the pendulum pointer 104 is substantially parallel with respect to the side of the wheel and the pendulum pointer 104 is arranged to oscillate in a direction at right angles with respect to the side of the wheel. With the gauge 13 mounted on the wheel in the above manner, the wheel is turned to one side of straight ahead a predetermined angle. The knob 88 is then operated to move the scale 82 so that the zero position on the scale aligns with the pointer 106 of the pendulum 104.

The wheel is then turned to the other side of straight ahead to an angular position corresponding to the first angular position of the wheel with respect to straight ahead. In changing the position of the wheel, the relative position of the gauge 13 is also changed, since the plane of the wheel due to the caster is tilted to a different position, and the angular position of the gauge supporting arm 63 is likewise given a different tilt. Consequently since the gauge 13 is supported lengthwise on the arm 63, the top of the gauge 13 will be disposed in a different angular position, and since the position of the pendulum pointer 106 remains unchanged, the scale 82 will indicate the difference between the two positions of the gauge and this difference is the caster inclination of the king pin in degrees.

Camber can be determined with the gauge 13 mounted on the wheel in the same position as it is mounted on the wheel during the caster tests. The first step in making a camber check is to set the wheel truly straight ahead. The amount of camber is determined by noting the position of the pendulum pointer 106 with respect to the camber scale 81 which is fixedly secured to the top of the gauge 13. Since the gauge 13 is carried by the clamp 11 in a predetermined position with respect to the wheel 14 and since the wheel is inclined outward at the top relative to a vertical line, the top of the gauge 13 having the camber scale 81 mounted thereon is also disposed at an angle with respect to the vertically disposed pendulum 104. Consequently, it is only necessary to note the degrees indicated by the pointer 106 on the scale 81, in order to determine the camber inclination.

When the bracket 12 is mounted on the clamp 11 with the rods 22, 23 extending through all four bosses 58, the bracket will be held rigid with respect to the clamp and the gauge 13 will be disposed with the position shown in Figs. 1, 2 and 3. During operation of the device the gauge 13 is adapted to be moved to other positions in order to check the king pin inclination, and so as to enable the gauge to be movably positioned with respect to the clamp 11, the bracket 12 can be withdrawn from the clamp 11 and then mounted on either the rod 22 or the rod 23 in the manner shown in Figs. 4, 5 and 6. In this latter position the bracket 12 can be rotated about the pivot provided by the rod to dispose the gauge in the desired position.

With the bracket 12 mounted on a single rod, either rod 22 or rod 23, the gauge 13 is mounted on the gauge supporting arm 63. The gauge and the bracket are then swung about the pivot provided by the pivotal connection of the bracket on the rod to a position in which the longitudinal center line of the housing of the gauge is disposed substantially parallel with the side of the wheel (see Fig. 5). In this position of the gauge the pendulum pointer 104 will swing in a direction parallel to the plane of the wheel.

With the gauge 13 mounted on the wheel in the above manner, the wheel is turned out to a position at a predetermined angle from straight ahead. The wheel is then locked against rotation in any suitable manner, so that it will not turn on the spindle while the test is being made. The knob is then operated to move scale 82 so that the zero position on said scale aligns with the pointer 106 of the pendulum 104.

The wheel is then turned inwardly to an angular position from straight ahead corresponding to the first angular position at which the wheel was set. The angular position of the gauge supporting arm 63 will be given a different tilt due to the king pin inclination, and consequently, since the body of the gauge 13 is supported lengthwise on the arm 63, the top of the gauge 13 will be disposed in a different angular position, and since the position of the pointer 106 remains unchanged, the scale 82 will indicate the difference between the two positions of the gauge and this difference is the king pin inclination in degrees.

Having now described my invention and in what manner the same is used, what I claim as new and desire to protect by Letters Patent is:

1. A device for measuring alignment characteristics of dirigible vehicle wheels comprising, a hollow body having aligned bores in opposing walls thereof, a clamp adapted to be rigidly secured to a wheel, a bracket carried by said clamp, an arm projecting outwardly from said bracket and extending through the aligned bores of said housing so that the latter is suspended from said arm for swinging movements in a plane, a graduated scale adjustably mounted on the upper portion of the hollow body, a pendulum arranged within said hollow body for swinging transversely thereof and having a pointer provided with an eye encircling said arm so as to permit unobstructed swinging movements of the pointer within said body for cooperation with said scale, means in said housing for pivotally connecting said pendulum thereto at a point substantially below said arm to thereby cause said housing to tend toward a vertical attitude, the length of the pointer being substantially greater than the length of the pendulum below said pivotal connecting means whereby the movements of said pointer relative to said scale are amplified in proportion to swinging movements of said pendulum within the body responsive to variations in the tilted attitude of said wheel during testing thereof, and means for adjusting the position of said scale to register its zero indication with the position of said pointer when the wheel is disposed in a predetermined position.

2. A device for measuring alignment characteristics of dirigible vehicle wheels comprising, a member having a hollow body, means for attaching said member to a wheel in pendent position comprising an arm carried by said wheel and extending through the body of said member at a point above the center of gravity of the member whereby the member is free to swing in a substantially vertical plane at right angles to the longitudinal center line of said arm, an indicating scale on the upper portion of said member, and a weighted pointer pivotally mounted within the hollow body of said member at a point beneath said arm, said pointer extending upwardly within the body of said member and having an eye formed therein through which the arm extends to permit free swinging movements of said pointer through a path intersecting the longitudinal center line of said arm.

3. A device for measuring alignment characteristics of dirigible vehicle wheels comprising a hollow body adapted to be applied to a wheel, a pendulum pivotally mounted within said body for swinging movements about an axis disposed in the lower region of said body, said pendulum having a pointer at the upper end thereof disposed in proximity to the top of the body, a scale comprising a loop of ribbon-like material having graduations thereon, said scale being disposed in the upper portion of the body in proximity to said pointer, a pair of spaced rollers mounted on shafts rotatably mounted in the body for supporting the loop, and a knob mounted on one of said shafts for turning the shaft to effect lengthwise movement of the loop whereby the relative position of the graduations on the scale with respect to said pointer can be adjusted.

4. A device for measuring alignment characteristics of dirigible vehicle wheels comprising, a gauge having a hollow body, means for attaching said gauge to the wheel in pendent position, a pendulum pivotally mounted within said gauge body for swinging movements transversely of the body and being connected to said body sufficiently below the point of attachment thereof to said wheel for maintaining said body in a vertical position, said pendulum extending upwardly within said body and having a pointer at the upper end thereof disposed in proximity to the top of the body the effective length of the pendulum below the pivotal axis thereof being substantially less than the distance from said axis to the upper end of the pointer so as to amplify the movement of the pointer adjacent the top of said body relative to the movement of said pendulum responsive to tilting of said wheel, a scale in the form of an endless piece of ribbon-like material having graduations thereon disposed in proximity to said pointer, a pair of rollers mounted on shafts arranged transversely in the upper portion of the body and spaced apart for supporting the scale, and a knob mounted on one of said shafts by which the roller on the shaft is adapted to be rotated to move the scale transversely of the hollow body of said gauge whereby the scale can be adjusted to indicate the alignment characteristics of the wheel.

5. A device for measuring alignment characteristics of a dirigible vehicle wheel comprising, a hollow housing formed of two complementary sections, each section having an inwardly projecting arcuate ledge at its upper end, the adjacent longitudinal edges of said ledges being spaced apart to provide a slot which extends across the top of the housing, the ends of said ledges being spaced from the end walls of the housing, a scale comprising an endless loop of ribbon-like material encircling one of said ledges with the upper stretch of said loop resting upon the upper surface of the same and formed with graduations thereon in proximity to the adjacent said slot, a pair of spaced rollers mounted on shafts rotatably mounted in the housing for supporting the ends of the scale loop, manually operable means fixed to one of said shafts for turning the shaft to effect lengthwise movement of the scale loop whereby the relative position of the graduations on the scale can be adjusted, and a pendulum pivotally mounted within said housing for swinging movement about an axis disposed in the lower region thereof and having a pointer disposed in said slot for cooperating with said graduated scales to indicate alignment characteristics of the wheel.

6. A device for measuring alignment characteristics of a dirigible vehicle wheel comprising, a hollow housing, a ledge projecting inwardly from one side wall at the upper portion of said housing, said ledge being spaced from the opposite side wall of the housing to provide a slot which extends transversely of the upper portion thereof, the ends of said ledge being spaced from the end walls of the housing, a graduated scale comprising an endless loop of material encircling the said ledge with the upper flight of the loop resting upon the upper surface of said ledge, means within the housing for supporting said loop with its upper reach disposed on said ledge, means for effecting movement of said loop whereby the graduations thereon can be shifted transversely along said ledge, and a pendulum pivotally mounted within said housing for swinging movement about an axis disposed in the lower region thereof and having a pointer disposed in said slot in proximity to the graduations on said scale.

7. A device for measuring alignment characteristics of dirigible vehicle wheels comprising, a bracket adapted to be detachably clamped to a wheel, an arm projecting outwardly from said bracket, a hollow body having aligned bores in opposing walls adapted pivotally to receive said arm therein whereby said body is suspended from said arm in a pendent position, a graduated scale on the upper portion of said hollow body, a pendulum within said body having a pointer cooperating with said scale and provided with an offset portion for clearing said arm during movement of said pointer within said body, and means for pivotally mounting said pendulum within said body at a point below said arm for tending to maintain said hollow body in a vertical position, said pivotal mounting means being spaced from said scale by a distance substantially greater than the length of said pendulum below said pivotal pendulum mounting means for effecting movements of said pointer therealong in amplified proportion to the movement of said pendulum responsive to tilting of said wheel thereby permitting enlargement of the spacing between the graduations of the scale.

8. A gauge for measuring the alignment characteristics of a dirigible vehicle wheel comprising, a shaft attached to said wheel so as to extend coaxially outwardly therefrom, a hollow housing having bores in opposite walls aligned to receive said shaft for effecting swinging movement of said housing, an indicating scale on the upper portion of said housing, a pointer pivotally mounted within said housing for swinging movement in a plane parallel with the disposition of said scale for cooperation therewith and having a weighted portion substantially below said shaft for balancing said housing in a pendent position thereon and to maintain said pointer upright, said pointer having an offset portion in the region of said shaft for permitting unobstructed movement of said pointer within said housing, and pivotal mounting means disposed in the lower region of said housing for pivotally supporting said pointer, said pivotal mounting means being located a substantial distance further from said scale than from the weighted lower end of said pointer to effect movement of the upper end of said pointer along the scale in greater proportion than the movement of the weighted lower portion of said pointer responsive to tilting of said wheel.

TRACY CARRIGAN.

REFERENCES CITED

The following references are of record in the file of this patent:

UNITED STATES PATENTS

| Number | Name | Date |
|---|---|---|
| 1,445,526 | McMorris | Feb. 13, 1923 |
| 1,804,490 | Bagge | May 12, 1931 |
| 2,022,452 | Aegerter | Nov. 26, 1935 |
| 2,029,364 | Duby | Feb. 4, 1936 |
| 2,077,082 | Wedlake | Apr. 13, 1937 |
| 2,177,669 | Martin | Oct. 31, 1939 |
| 2,285,965 | Halstead | June 9, 1942 |
| 2,378,631 | Holmes | June 19, 1945 |

FOREIGN PATENTS

| Number | Country | Date |
|---|---|---|
| 122,280 | Great Britain | Jan. 23, 1919 |